(12) United States Patent
Katougi et al.

(10) Patent No.: US 6,580,049 B1
(45) Date of Patent: Jun. 17, 2003

(54) ELECTRIC DISCHARGE MACHINING METHOD AND DEVICE

(75) Inventors: Hidetaka Katougi, Tokyo (JP); Takayuki Nakagawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/786,866

(22) PCT Filed: Jul. 12, 1999

(86) PCT No.: PCT/JP99/03744
§ 371 (c)(1),
(2), (4) Date: Mar. 12, 2001

(87) PCT Pub. No.: WO01/03872
PCT Pub. Date: Jan. 18, 2001

(51) Int. Cl.$^7$ ............... B23H 1/02; B23H 7/28
(52) U.S. Cl. ................... 219/69.2; 219/69.17
(58) Field of Search ............ 700/162; 219/69.16, 219/69.2, 69.17

(56) References Cited

U.S. PATENT DOCUMENTS

| | | | | |
|---|---|---|---|---|
| 4,152,570 A | * | 5/1979 | Inoue et al. | 219/69.2 |
| 4,367,391 A | * | 1/1983 | Furukawa | 219/69.2 |
| 4,400,606 A | * | 8/1983 | Itoh et al. | 219/69.2 |
| 4,948,934 A | * | 8/1990 | Behmer | 219/69.2 |
| 5,051,912 A | * | 9/1991 | Johanson et al. | 700/162 |

FOREIGN PATENT DOCUMENTS

| | | | | |
|---|---|---|---|---|
| JP | 2-100830 | | 4/1990 | B23H/7/28 |
| JP | 2-212026 | | 8/1990 | B23H/7/28 |
| JP | 3-149137 | | 6/1991 | B23H/7/28 |
| JP | 4-19018 | | 1/1992 | B23H/7/28 |
| JP | 5-42423 A | * | 2/1993 | |
| JP | 6-126540 | | 5/1994 | B23H/7/20 |
| JP | 7-299666 A | * | 11/1995 | |
| JP | 10-166224 | | 6/1998 | B23H/7/28 |

\* cited by examiner

Primary Examiner—Geoffrey S. Evans
(74) Attorney, Agent, or Firm—Sughrue Mion, PLLC

(57) ABSTRACT

In an electric discharge machining method and apparatus of dividing a rocking shape for a change in a swing speed and a rocking movement completion determination and determining whether or not a target machining shape is reached every each division shape and completing rocking machining when the rocking movement completion determination is made in all the division shapes, the rocking shape is divided so that either one or both of each corner and the center of each side of the target machining shape is located on a bisector or substantially a bisector of a division angle ($\theta$s).

8 Claims, 11 Drawing Sheets

DIVISION SHAPE 3
AMOUNT OF RESIDUAL MACHINING : SMALL
SWING SPEED : HIGH

DIVISION SHAPE 2
AMOUNT OF RESIDUAL MACHINING : SMALL
SWING SPEED : HIGH

ELECTRODE MOVEMENT DIRECTION

TARGET MACHINING SHAPE

WORKPIECE

DIVISION SHAPE 1
AMOUNT OF RESIDUAL MACHINING : LARGE
SWING SPEED : LOW

FIG.4

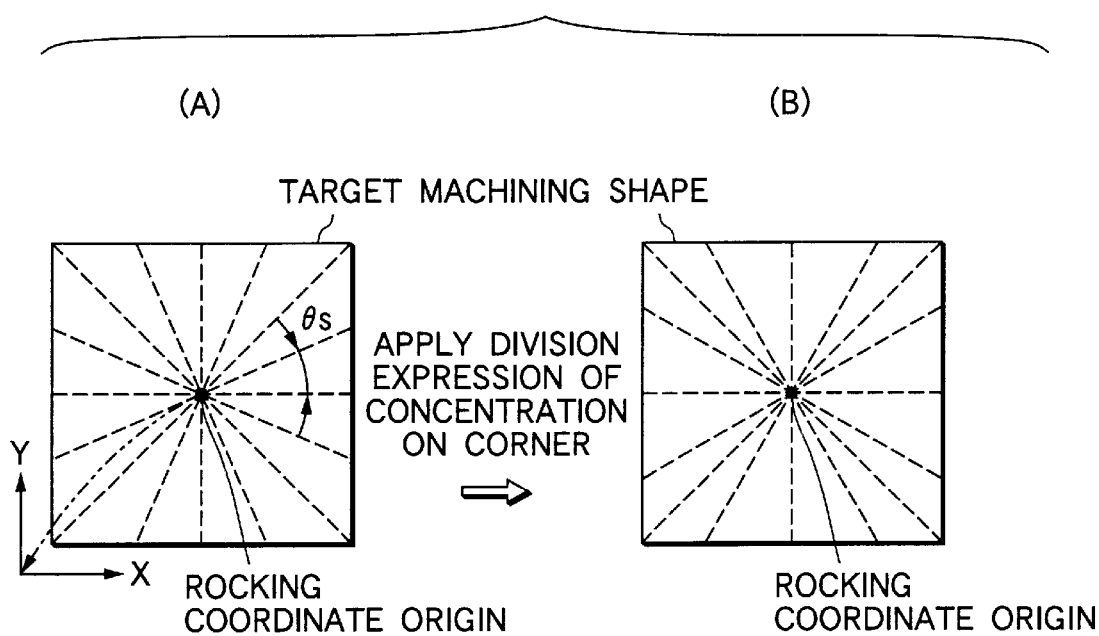

(A)      (B)

TARGET MACHINING SHAPE

APPLY DIVISION EXPRESSION OF CONCENTRATION ON CORNER ⇒

ROCKING COORDINATE ORIGIN $$N = \frac{S \times E}{360} + \frac{S \times 45}{360} \times \sin(2\theta - 90) : \text{FIRST OR THIRD QUADRANT}$$

$$N = \frac{S \times E}{360} - \frac{S \times 45}{360} \times \sin(2\theta - 90) : \text{SECOND OR FOURTH QUADRANT}$$

N : THE NUMBER OF THE DIVISION SHAPE
S : THE NUMBER OF DIVISIONS
E : POSITION OF CORNER (45, 135, 225, 315)
$\theta$ : ANGLE OF ELECTRODE POSITION VIEWED FROM ROCKING COORDINATE ORIGIN

FIG.7
(A)
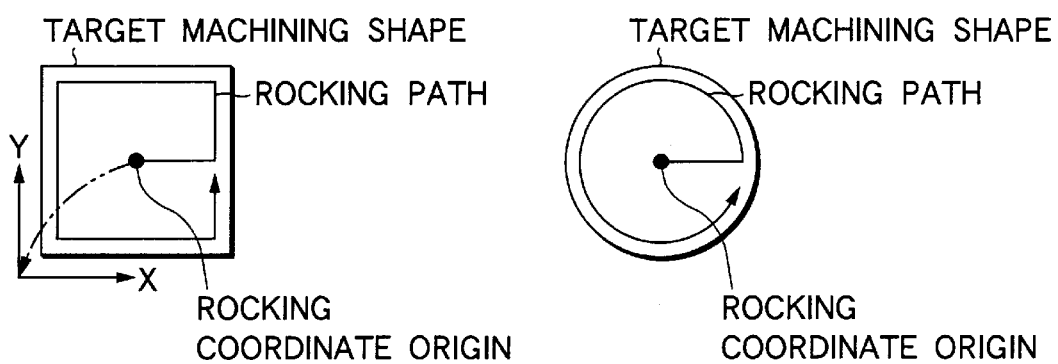
(B)
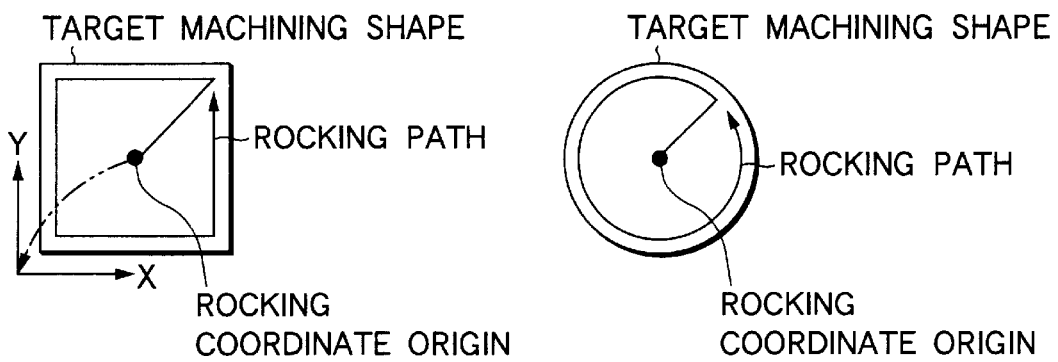

FIG.8
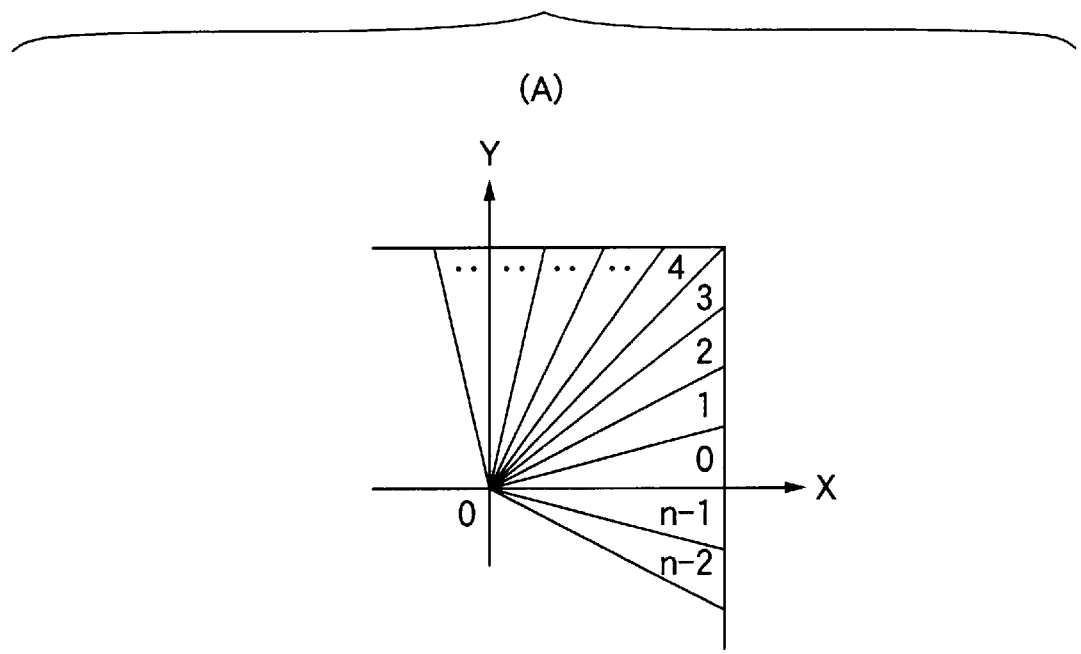
(A)
DIVIDE ONE QUADRANT
INTO AN EVEN NUMBER
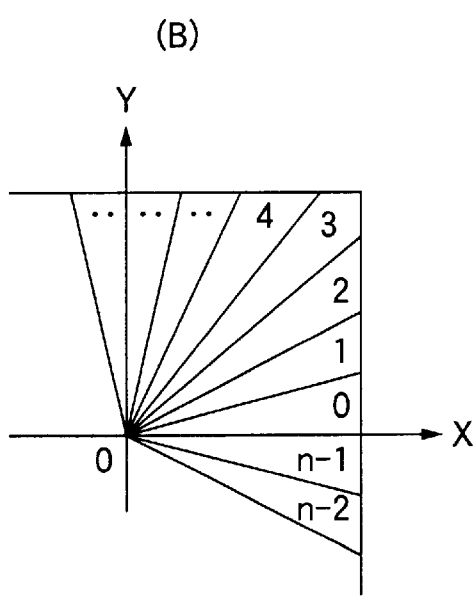
(B)
DIVIDE ONE QUADRANT
INTO AN ODD NUMBER

FIG.10 PRIOR ART
(A)
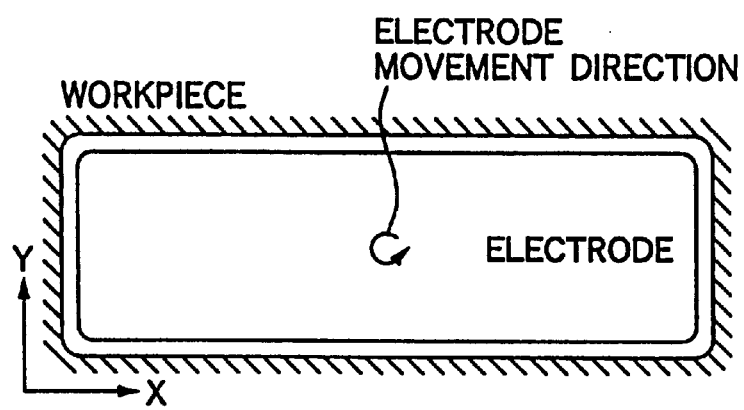
(B)
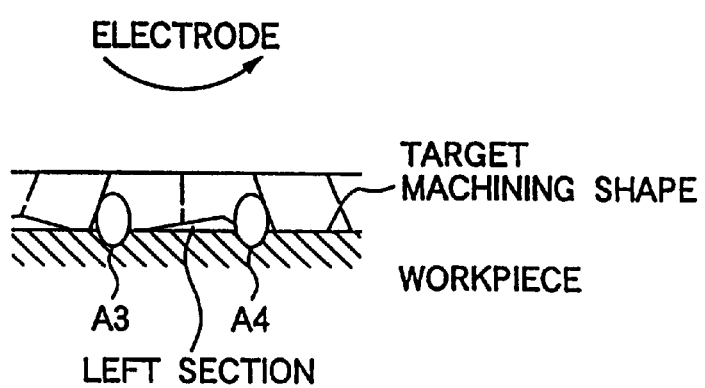

ELECTRIC DISCHARGE MACHINING METHOD AND DEVICE

TECHNICAL FIELD

This invention relates to improvements in an electric discharge machining method and apparatus for performing machining (rocking machining) while rocking an electrode with respect to a workpiece in a plane vertical to a machining feed direction.

BACKGROUND ART

Rocking machining is intended for efficiently ejecting work scrap with stirring by performing electric discharge machining to a workpiece while moving an electrode relatively with respect to the workpiece in a plane vertical to a machining feed direction. Also, simple shapes such as circle or rectangle are generally used as a rocking shape, and the shape similar to an electrode shape is obtained as the shape after machining the workpiece.

Such rocking machining includes means for performing constant-speed rocking with a constant swing speed, means for controlling the amount of electrode transfer according to an interelectrode voltage between an electrode and a workpiece as disclosed in JP-A-6-126540, means for controlling the amount of electrode transfer by the amount of residual machining calculated from a difference between an electrode position and a target machining shape as disclosed in JP-A-2-212026, and so on.

Also, there is means for dividing a rocking shape for a change in a swing speed and a rocking movement completion determination and determining whether a target machining shape is attained every each division shape and completing the rocking machining when the rocking movement completion determination is made in all the division shapes, and such a machining method is disclosed in JP-A-2-212026, JP-A-6-126540, JP-A-10-166224, and so on.

In a method using an interelectrode voltage for a change in a swing speed, it is necessary to detect the interelectrode voltage during machining and predetermine the amount of electrode transfer based on interelectrode voltage data. Thus, an apparatus for detecting and calculating the interelectrode voltage and data of the amount of electrode transfer based on the interelectrode voltage data must be provided. Also, in constant-speed rocking, in the case of dividing a rocking shape and making a rocking completion determination, it becomes a constant swing speed even within the division shape in which a target shape has been attained and the rocking completion determination has been made, so that waste time increases. Further, in the constant-speed rocking, when a factor which deteriorates properties of a machined surface of abnormal electric discharge due to an electric discharge concentration or a short circuit etc. or secondary electric discharge performed through work scrap and so on occurs, the rocking is performed at the constant swing speed, so that continuous time of abnormal electric discharge etc. is the same at all the positions and it is difficult to break the continuation of the abnormal electric discharge etc. by rocking movement, with the result that machining tends to become unstable.

FIG. 7 is a diagram showing rocking paths, and as shown in FIG. 7A, there is a rocking path for performing machining by a predetermined amount of rocking after movement from the rocking coordinate origin to the X-axis positive direction and as shown in FIG. 7B, there is a rocking path for performing machining by a predetermined amount of rocking after movement from the rocking coordinate origin to a direction of 45° (for example, it is assumed that a counterclockwise direction is positive.) with respect to the X-axis positive direction. Also, FIG. 8 is a diagram showing dividing examples of a rocking shape, and since a division is started on the X-axis of the rocking coordinates in the division of a conventional rocking shape, when the rocking shape is equally divided into n portions, there are a case of dividing one quadrant into an even number as shown in FIG. 8A and a case of dividing one quadrant into an odd number as shown in FIG. 8B. A division expression of such a division is given by N=θ/360×S (where digits to the right of the decimal point are discarded) when it is assumed that the number of the division shape is N (N=0, 1, 2..., n−1) and an angle of an electrode position viewed from the rocking coordinate origin is θ (the X-axis positive direction is θ=0°) and the number of divisions of the rocking shape is S. In the case of making a completion determination every each division shape, depending on the number of divisions (for example, the case of equally making an even-numbered division in multiples of 8), when the completion determination is made at A1 and A2 of adjacent division shapes in a corner portion of a target machining shape of a workpiece as shown in FIG. 9, a large left section occurs in this corner portion and shape accuracy becomes worse. Also, in rocking machining of an elongated electrode shape as shown in FIG. 10A, a difference in a machining area per each division shape becomes large and as shown in FIG. 10B, two division shapes are used in the center of each side of a target machining shape of a workpiece, so that a large left section occurs and shape accuracy becomes worse when a completion determination is made, for example, at A3 and A4 as shown in FIG. 10B.

FIG. 11 is an illustration showing a division example of a rocking shape in rocking machining capable of switching a swing speed every division shape, and in such rocking machining, the swing speed is determined on the basis of the amount of residual machining calculated from a difference between a target machining shape and the present electrode position and a high swing speed (for example, V1 of FIG. 11) is given when a left section is small and a low swing speed (for example, V2 of FIG. 11) is given when a left section is large. Also, in the case that an electrode moves from a division shape in which the high swing speed V1 is given to a division shape in which the low swing speed V2 is given, when the speed difference between the high swing speed V1 and the low swing speed V2 is large, the electrode reaches the inside of the division shape in which the low swing speed V2 is given at the high swing speed V1 due to a delay etc. of calculation time. Therefore, in such a case, a left section tends to occur, so that shape accuracy becomes worse and further machining time becomes long.

DISCLOSURE OF THE INVENTION

This invention is implemented to solve the problems described above, and an object of the invention is to obtain an electric discharge machining method and apparatus capable of improving machining shape accuracy and reducing machining time in the electric discharge machining method and apparatus with high machining stability of dividing a rocking shape for a change in a swing speed and a rocking movement completion determination and determining whether or not a target machining shape is reached every each division shape and completing rocking machining when the rocking movement completion determination is made in all the division shapes.

With an electric discharge machining method according to a first invention, in the electric discharge machining method of dividing a rocking shape for a change in a swing speed and a rocking movement completion determination and determining whether or not a target machining shape is reached every each division shape and completing rocking machining when the rocking movement completion determination is made in all the division shapes, the rocking shape is divided so that either one or both of each corner and the center of each side of the target machining shape is located on a bisector or substantially a bisector of a division angle.

With an electric discharge machining method according to a second invention, in the electric discharge machining method of dividing a rocking shape for a change in a swing speed and a rocking movement completion determination and determining whether or not a target machining shape is reached every each division shape and completing rocking machining when the rocking movement completion determination is made in all the division shapes, the rocking shape is divided while changing a division angle.

With an electric discharge machining method according to a third invention, in the electric discharge machining method according to the second invention, the rocking shape is divided so that the division angle becomes smaller with an approach to each corner of the target machining shape.

With an electric discharge machining method according to a fourth invention, in the electric discharge machining method of dividing a rocking shape for a change in a swing speed and a rocking movement completion determination and determining whether or not a target machining shape is reached every each division shape and completing rocking machining when the rocking movement completion determination is made in all the division shapes, a first swing speed calculated from the amount of residual machining at the time of swing before one round in a first division shape which is any one of the division shapes is compared with a second swing speed calculated from the amount of residual machining at the time of swing before one round in a division shape forward by a predetermined number of divisions before the first division shape is reached, and when a value of (the second swing speed minus the first swing speed) exceeds a predetermined standard and is large, the swing speed is reduced from the division shape forward by the predetermined number of divisions and an electrode is moved to the first division shape.

With an electric discharge machining apparatus according to a fifth invention, in the electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, there is provided a rocking shape division part having a function of dividing the rocking shape so that either one or both of each corner and the center of each side of the target machining shape is located on a bisector or substantially a bisector of a division angle.

With an electric discharge machining apparatus according to a sixth invention, in the electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, there is provided a rocking shape division part having a function of dividing the rocking shape while changing a division angle.

With an electric discharge machining apparatus according to a seventh invention, in the electric discharge machining apparatus according to the sixth invention, the rocking shape division part has a function of dividing the rocking shape so that the division angle becomes smaller with an approach to each corner of the target machining shape.

With an electric discharge machining apparatus according to an eighth invention, in the electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, there are provided a residual machining amount calculation part having a function of calculating the amount of residual machining from a difference between the target machining shape and the present electrode position, and a rocking movement control part having a function of setting the swing speed using swing speed data previously prepared from the amount of residual machining calculated from the residual machining amount calculation part and a function of comparing a first swing speed calculated from the amount of residual machining at the time of swing before one round in a first division shape which is any one of the division shapes with a second swing speed calculated from the amount of residual machining at the time of swing before one round in a division shape forward by a predetermined number of divisions before the first division shape is reached and reducing the swing speed from the division shape forward by the predetermined number of divisions and moving an electrode to the first division shape when a value of (the second swing speed minus the first swing speed) exceeds a predetermined standard and is large.

This invention has the following effects since the invention is constructed as described above.

The first invention and the fifth invention have an effect capable of reducing a left section and improving machining shape accuracy higher.

The second invention and the sixth invention have an effect capable of obtaining a division shape according to required shape accuracy or required machining time, and so on.

The third invention and the seventh invention have an effect capable of reducing a left section of the corner and improving machining shape accuracy higher.

The fourth invention and the eighth invention have an effect capable of reducing a left section and improving machining shape accuracy. Further, the inventions have an effect capable of reducing machining time.

BRIEF DESCRIPTION OF THE DRAWINGS

FIG. 4 is an illustration showing a dividing method of a rocking shape according to an electric discharge machining method of a second embodiment of the invention.

FIG. 7 is a diagram showing rocking paths.

FIG. 8 is a diagram showing dividing examples of a conventional rocking shape.

FIG. 10 is an illustration showing the conventional machining example.

BEST MODE FOR CARRYING OUT THE INVENTION

First Embodiment

Figure 1:
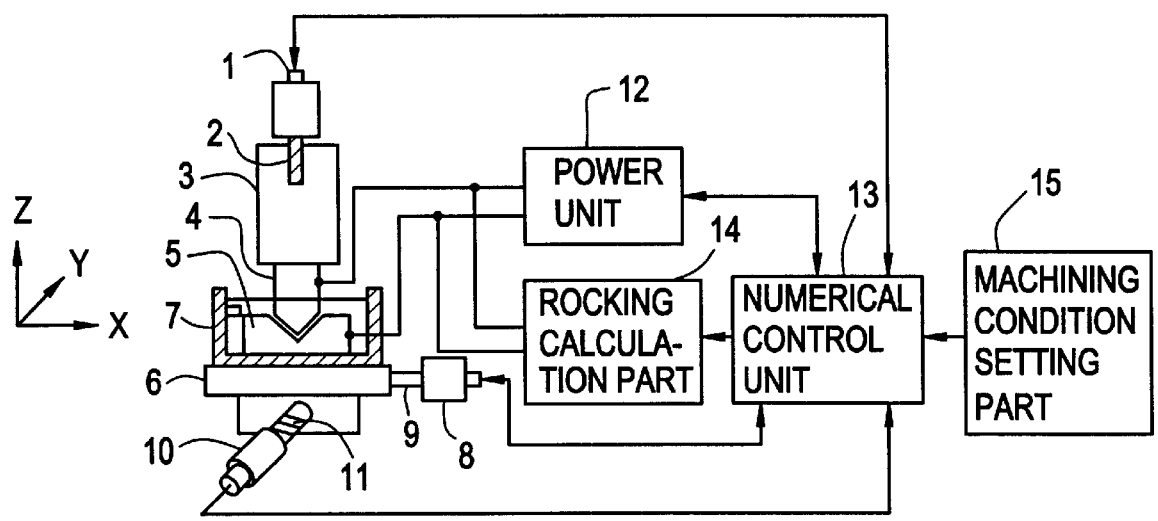
FIG. 1 is a configuration diagram showing an electric discharge machining apparatus of a first embodiment of this invention.

FIG. 1 is a configuration diagram showing an electric discharge machining apparatus of a first embodiment of this invention, and in the drawing, numeral 1 is a motor for Z-shaft driving, and numeral 2 is a Z-shaft which is a main shaft driven in the Z direction by the motor 1 for Z-shaft driving, and numeral 3 is a machining head fixed on the Z-shaft 2, and numeral 4 is an electrode mounted in the machining head 3, and numeral 5 is a workpiece, and numeral 6 is a worktable, and numeral 7 is a machining bath placed on the worktable 6 and in the machining bath 7, machining liquid is injected and also the workpiece 5 is fixed. Also, numeral 8 is a motor for X-shaft driving, and numeral 9 is an X-shaft driven in the X direction by the motor 8 for X-shaft driving, and numeral 10 is a motor for Y-shaft driving, and numeral 11 is a Y-shaft driven in the Y direction by the motor 10 for Y-shaft driving. Also, numeral 12 is a power unit, and numeral 13 is a numerical control unit, and numeral 14 is a rocking calculation part, and numeral 15 is a machining condition setting part.

Figure 2:
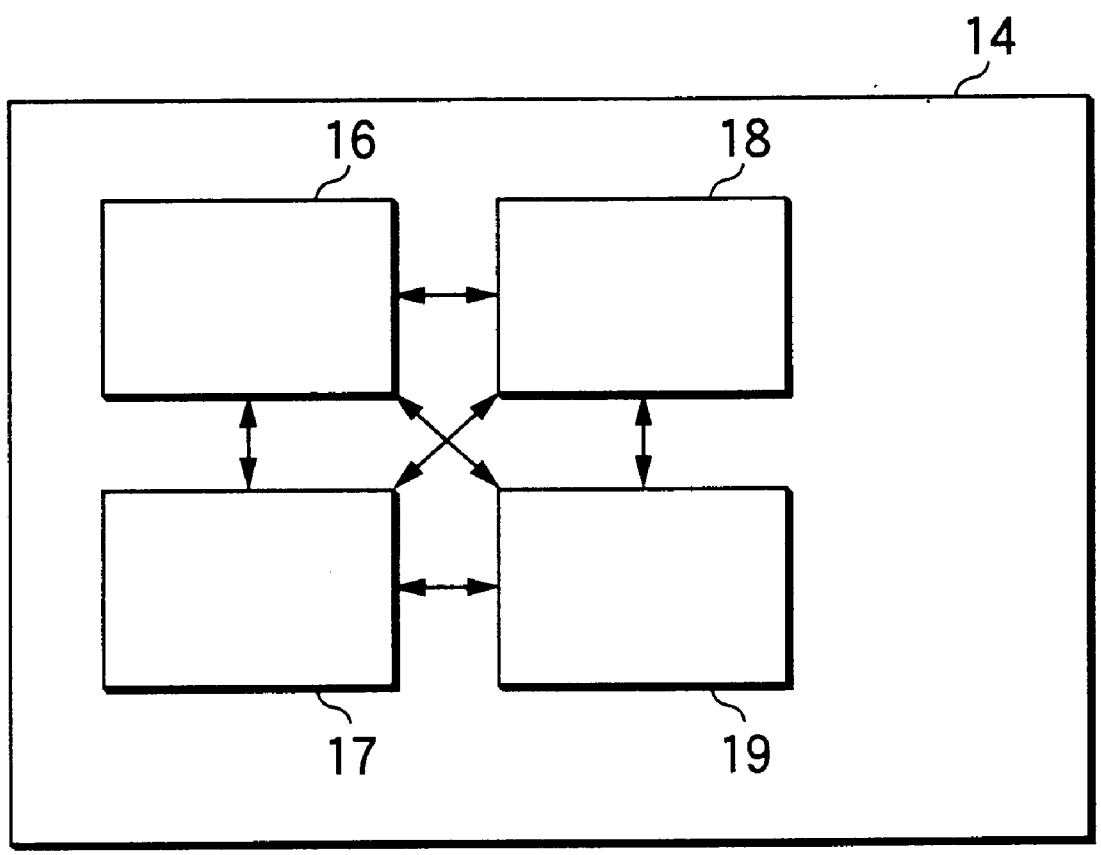
FIG. 2 is a block diagram showing a configuration of a rocking calculation part of the invention.

Also, FIG. 2 is a block diagram showing a configuration of the rocking calculation part 14, and numeral 16 is a rocking shape division part having a function of dividing a rocking shape based on information about rocking machining on machining conditions given by the machining condition setting part 15, and numeral 17 is a residual machining amount calculation part having a function of calculating the amount of residual machining obtained by a difference between a target rocking shape and the present electrode position during machining, and numeral 18 is a rocking movement completion determination part having a function of storing a position of the rocking shape while outputting a rocking movement completion signal in a division shape in which the amount of residual machining calculated by the residual machining amount calculation part 17 is "0" and a command machining depth is reached and storing the amount of residual machining when the amount of residual machining is not "0", and numeral 19 is a rocking movement control part having a function of providing a low swing speed when the amount of residual machining calculated by the residual machining amount calculation part 17 is large and providing a high swing speed when the amount of residual machining is small. In all the divided rocking shapes, machining can be performed with high accuracy by making a completion determination by the rocking movement completion determination part 18.

Next, operations will be described by way of FIGS. 1 and 2. The numerical control unit 13 has an electrode position detecting part, and performs control of relative movement of the electrode 4 and the workpiece 5 by driving the motor 1 for Z-shaft driving, the motor 8 for X-shaft driving and the motor 10 for Y-shaft driving according to the machining conditions set by the machining condition setting part 15. The electrode 4 and the workpiece 5 are opposed each other with an electric discharge gap in the machining liquid, and machining electric power is supplied from the power unit 12 between the electrode 4 and the workpiece 5, and the workpiece 5 is machined through electric discharge by the machining conditions previously incorporated by the machining condition setting part 15 (or inputted by an operator).

Then, rocking operations will be described. In the rocking calculation part 14, each of the amount of movement ΔX, ΔY, ΔZ of the X-shaft 9, the Y-shaft 11, the Z-shaft 2 per unit time is calculated and this calculated data is sent out to the numerical control unit 13. By the numerical control unit 13, the motor 8 for X-shaft driving, the motor 10 for Y-shaft driving and the motor 1 for Z-shaft driving are driven and controlled so as to draw a rocking shape based on a predetermined rocking condition, and the electrode 4 and the workpiece 5 are relatively rocked along the rocking shape.

Figure 3:
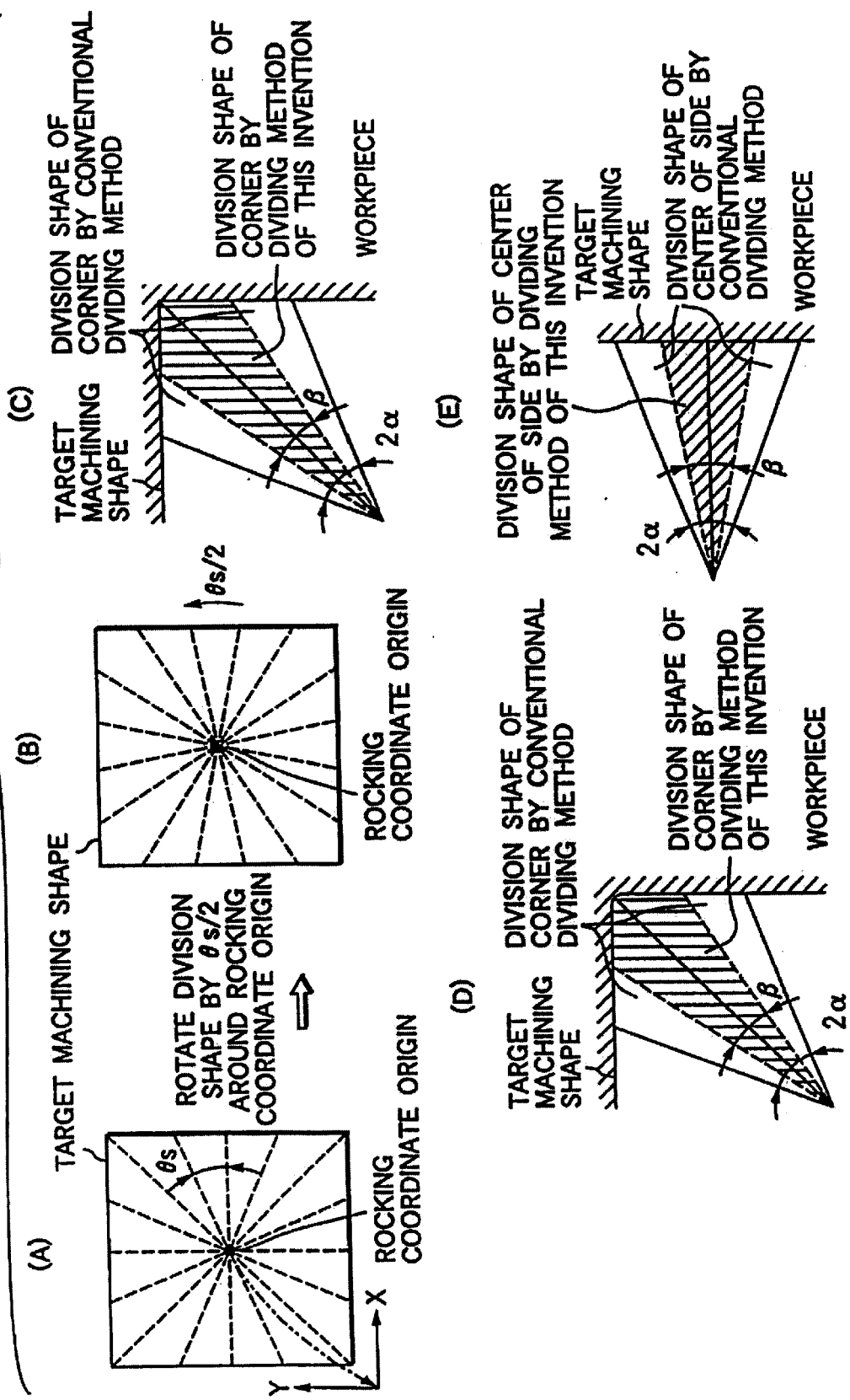
FIG. 3 is an illustration showing a dividing method of a rocking shape of the invention.

Then, a dividing method of a rocking shape will be described. FIG. 3 is an illustration showing the dividing method of the rocking shape, and indicates an example of the case that the number of divisions is set at 16. In machining of such a polygonal target machining shape, shape accuracy of each corner and the center of each side is important. FIG. 3A shows a conventional division shape, and FIG. 3B shows a division shape of this invention. The division shape (FIG. 3B) of this invention is a shape in which the conventional division shape (FIG. 3A) is rotated by half of a division angle θs around the rocking coordinate origin. A division expression of such a division is given by, for example, N=θ/360×S+0.5 (where digits to the right of the decimal point are discarded) when it is assumed that the number of the division shape is N (N=0, 1, 2, . . . ) and an angle of an electrode position viewed from the rocking coordinate origin is θ (the X-axis positive direction is θ=0°) and the number of divisions of the rocking shape is S.

In FIG. 3B showing the division shape of this invention, each corner (θ=45°, 135°, 225°, 315°) and the center (θ=0°, 90°, 180°, 270°) of each side of the target machining shape are located on a bisector of the division angle θs.

FIGS. 3C and 3D show a state of superimposing the case by a conventional dividing method on the case by a dividing method of this invention in relation to a division shape of the corner of the target machining shape. In the case by the conventional dividing method, two division shapes are adjacently arranged in the corner of the target machining shape, and in the case by the dividing method of this invention, only one division shape is arranged in the corner of the target machining shape. Thus, when a division angle of the division shape including the corner is α for the case by the conventional dividing method and is β for the case by the dividing method of this invention, β=α/2 and this is used in detection of a machining state of the corner or completion determination. For the division angle of the division shape including the corner, the division angle of the case by the dividing method of this invention (β) is smaller than that of the case by the conventional dividing method (α). Thus, in the dividing method of this invention, a left section of the corner can be reduced and shape accuracy can be improved higher.

FIG. 3E shows a state of super imposing the case by a conventional dividing method on the case by a dividing method of this invention in relation to a division shape of the center of a side of the target machining shape. In a manner similar to the cases of the corners of FIGS. 3C and 3D, when a division angle of the division shape including the center of the side is α for the case by the conventional dividing method and is β for the case by the dividing method of this invention, β=α/2 and this is used in detection of a machining state of the center of the side or completion determination. For the division angle of the division shape including the center of the side, the division angle of the case by the dividing method of this invention (β) is smaller than that of the case by the conventional dividing method (α). Thus, in the dividing method of this invention, a left section of the center of the side can be reduced and shape accuracy can be improved higher.

As described above, the dividing method of this invention is important in machining of a polygonal target machining shape. The shape accuracy of each the corner and the center of each the side can be improved higher.

The case of the polygonal target machining shape has been described above, but combinations of a part of a polygon and other shapes, etc. may be used.

Also, as a rocking shape, a polygon, a circular arc or their combinations, etc. maybe used according to the target machining shape.

Also, in the above description, the case of making a division so that each the corner or the center of each the side of the target machining shape is located on the bisector of the division angle has been shown, but similar effect is obtained as long as each the corner or the center is located in the neighborhood of this bisector even when each the corner or the center is not located on the bisector of the division angle.

Second Embodiment

FIG. 4 is an illustration showing a dividing method of a rocking shape according to an electric discharge machining method of a second embodiment of this invention, and FIG. 4A shows an example of a conventional division shape, and FIG. 4B shows a method for dividing the rocking shape so that a division angle θs becomes smaller with an approach to a corner of a target machining shape according to this invention. The division as shown in FIG. 4B can be implemented by using, for example, a trigonometric function as a division expression. That is, when it is assumed that the number of the division shape is N and the number of divisions is S and an angle of an electrode position viewed from the rocking coordinate origin is θ (the X-axis positive direction is θ=0°) and positions of corners of the target machining shape are E (in FIG. 4, 45° for the first quadrant, 135° for the second quadrant, 225° for the third quadrant, 315° for the fourth quadrant), N=S×E/360+S×45/360×sin (2θ−90) (where digits to the right of the decimal point are discarded) in the first or third quadrant and N=S×E/360−S× 45/360×sin(2θ−90) (where digits to the right of the decimal point are discarded) in the second or fourth quadrant, and the rocking shape can be divided so that the division angle θs becomes smaller with an approach to the corner of the target machining shape. Thus, a left section of the corner can be reduced and shape accuracy can be improved higher.

In the above description, the case that the target machining shape is a quadrilateral has been described, but even in a case of having corners of cases etc. that the target machining shape is other polygons, the division shape can be concentrated on the corner in like manner. Thus, a left section of the corner can be reduced and shape accuracy can be improved higher.

By changing the division angle θs in this manner, the division shape according to required shape accuracy or required machining time, etc. can be obtained.

Third Embodiment

An electric discharge machining apparatus of a third embodiment of this invention will be described below. In a configuration similar to that of FIGS. 1 and 2 shown in the first embodiment, the residual machining amount calculation part 17 calls electrode positions in the rocking coordinates momentarily from the numerical control unit 13 having the electrode detecting part and calculates the electrode position of the case that a target rocking shape has been reached from numerical data of a rocking shape among the machining conditions given by the machining condition setting part 15 and calculates the amount of residual machining from a difference between the target rocking shape and the present electrode position and transfers this calculated result to the rocking movement control part 19. The rocking movement control part 19 sets a swing speed using swing speed data previously prepared from the amount of residual machining calculated from the residual machining amount calculation part 17, and has a function of sending an electrode operation command to the numerical control unit 13. Also, the rocking movement control part 19 has an advanced read function of calling the amount of residual machining stored by the rocking movement completion determination part 18 and the swing speed corresponding to the amount from the front of the position with a large amount of residual machining (that is, a low swing speed) and reducing the swing speed from a high speed swing part to move the electrode to a low speed swing part when a machining state with a large difference in the swing speed is detected.

Figure 5:
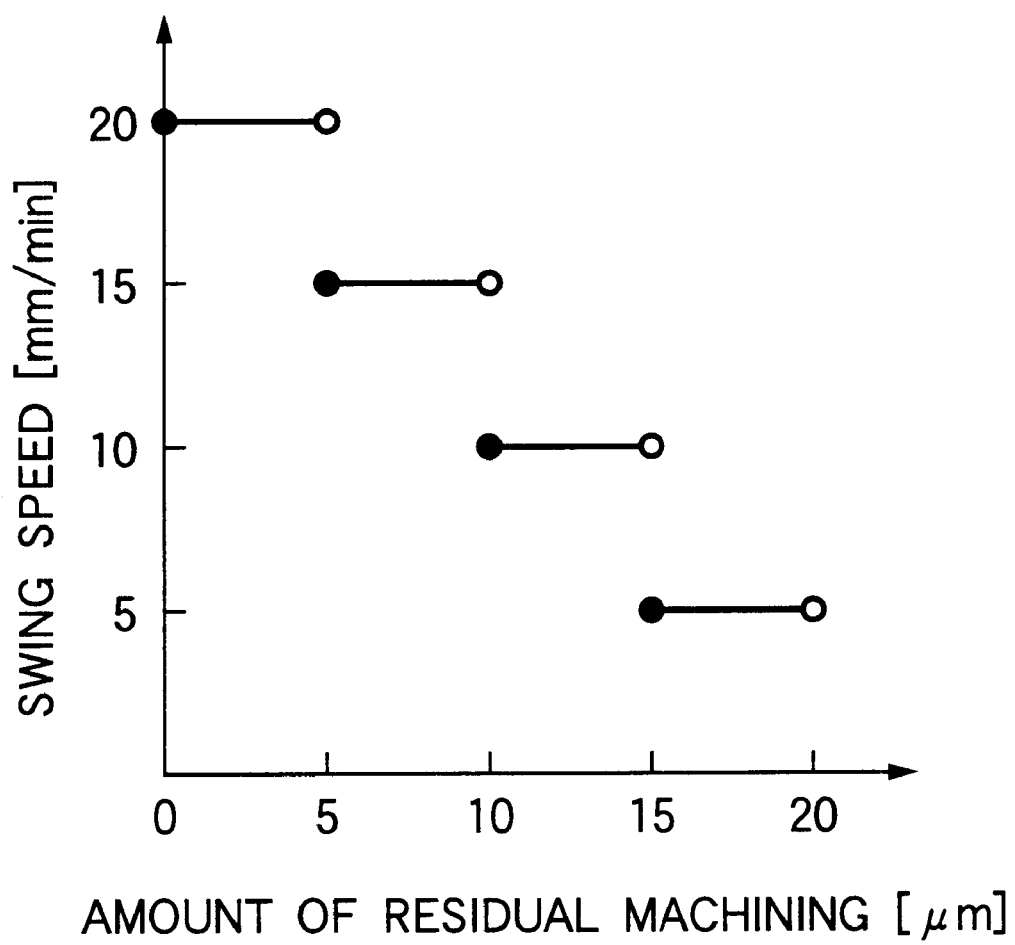
FIG. 5 is a graph showing one example of a relation between the amount of residual machining and a swing speed.

FIG. 5 is a graph showing one example of a relation between the amount of residual machining and the swing speed, and in this example, the swing speed of the case that the amount of residual machining calculated from the residual machining amount calculation part 17 is 0 to 5 μm is given by 20 mm/min and the swing speed of the case that the amount of residual machining is 15 to 20 μm is given by 5 mm/min. By changing the swing speed according to the amount of residual machining, stable machining can be performed without continuing abnormal electric discharge even when a machining allowance as finishing machining is small.

Figure 6:
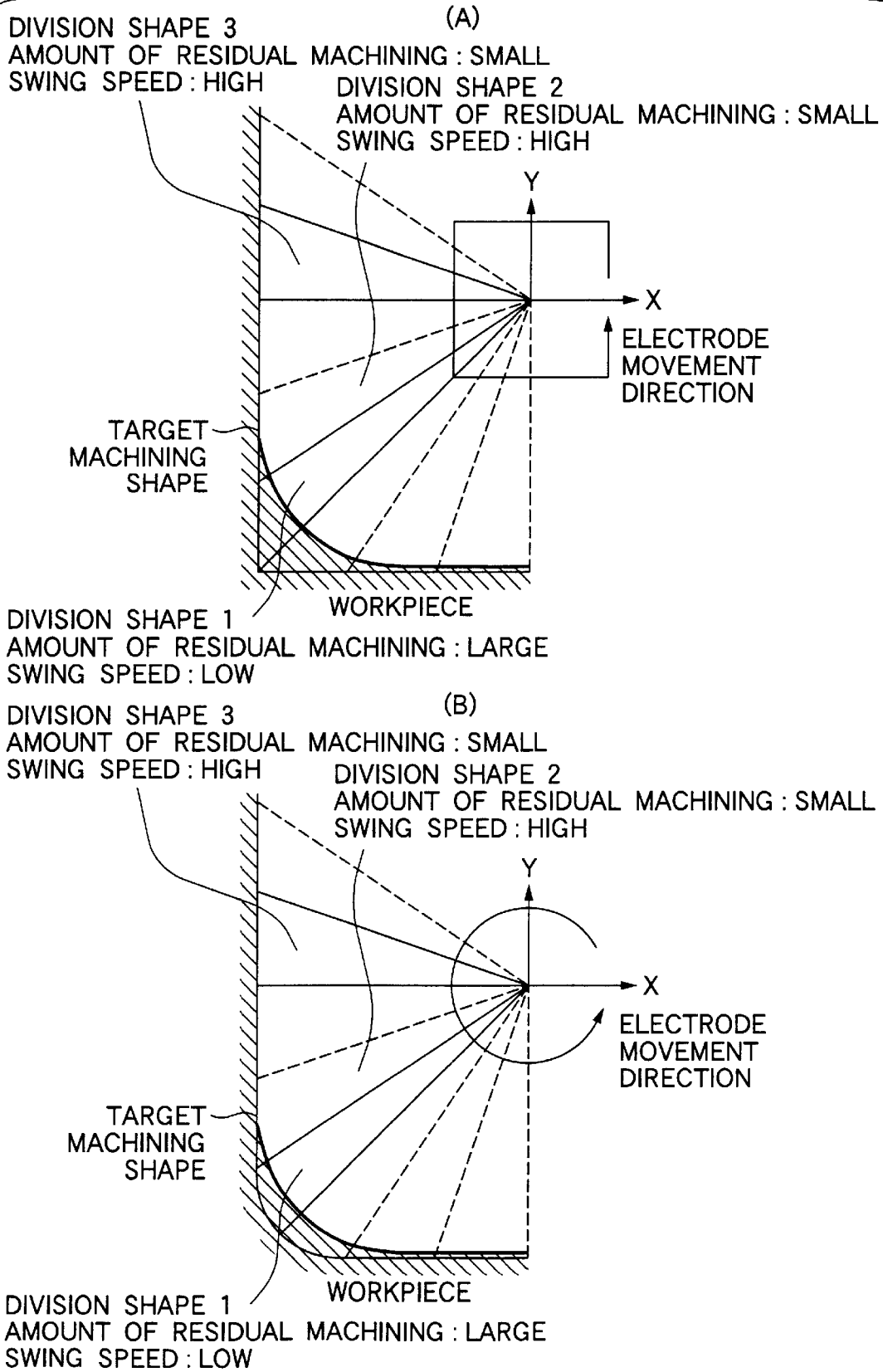
FIG. 6 is an illustration of an advanced read function of a rocking movement control part in an electric discharge machining apparatus of a third embodiment of the invention.
Figure 9:
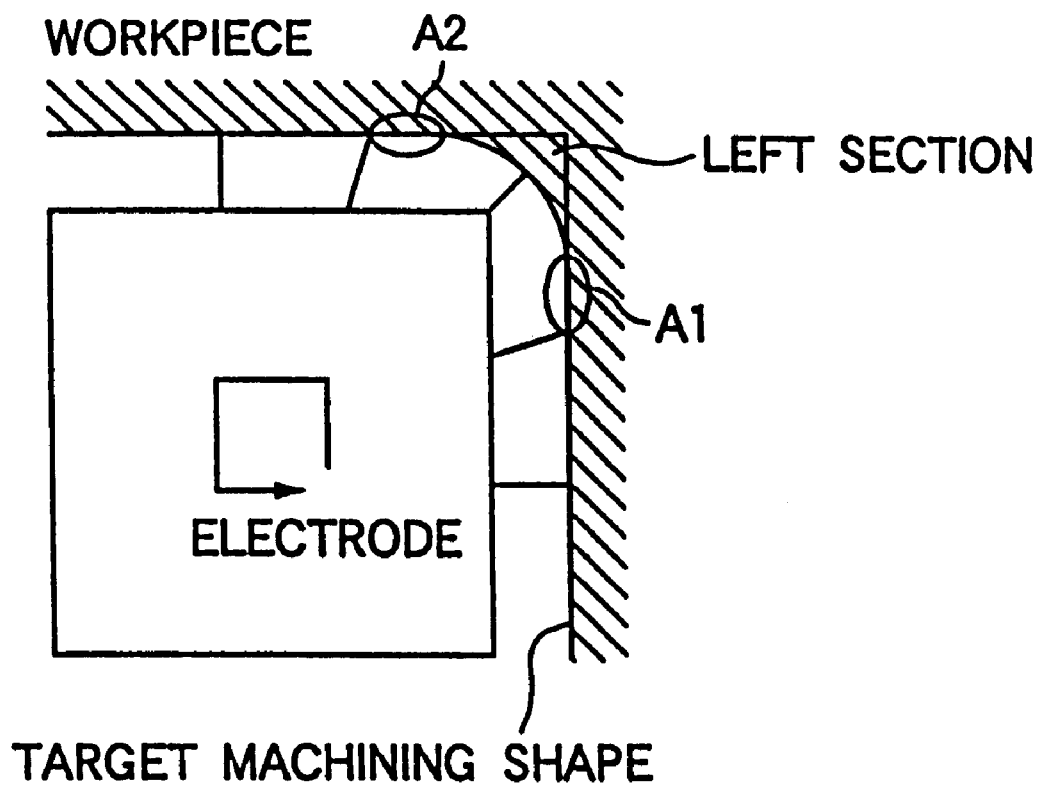
FIG. 9 is an illustration showing a conventional machining example.
Figure 11:
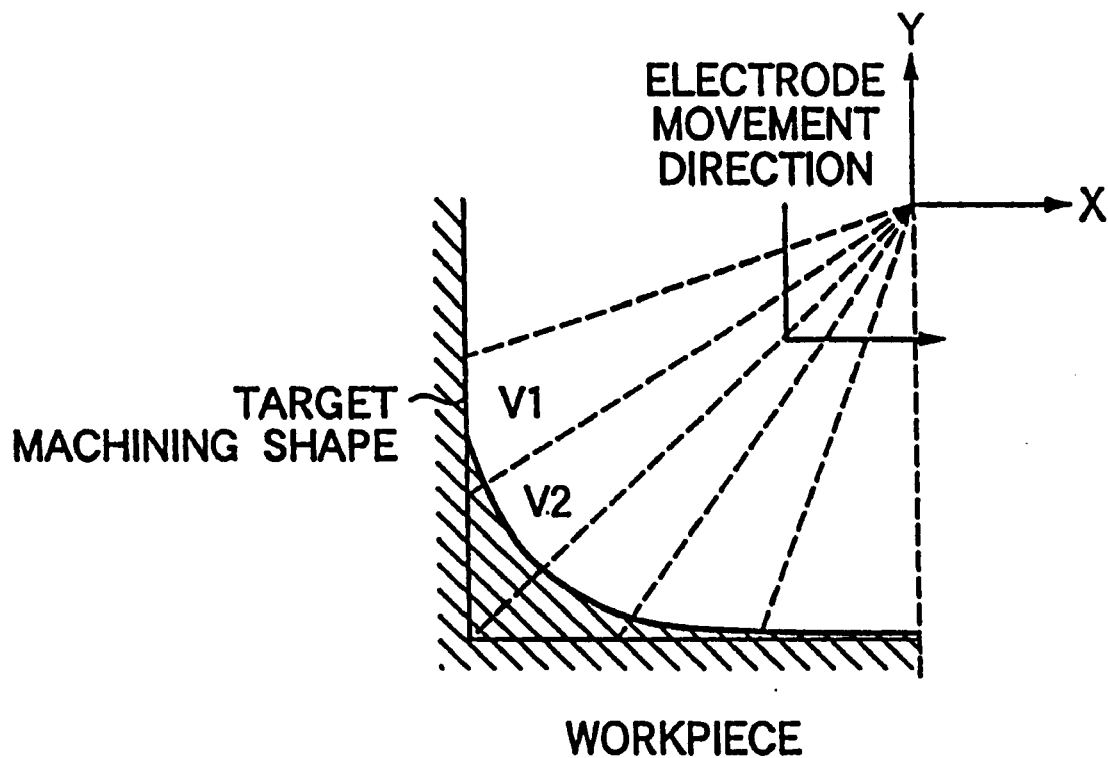
FIG. 11 is an illustration showing the conventional machining example.

FIG. 6 is an illustration of an advanced read function of a rocking movement control part in an electric discharge machining apparatus of a third embodiment of this invention, and FIG. 6A shows a case that a corner of a target machining shape is straight, and FIG. 6B shows a case that a corner of a target machining shape is a circular arc. Here, it is assumed that a relation between the amount of residual machining and the swing speed is similar to that of FIG. 5. In FIG. 6, when it is assumed that the amount of residual machining is 15 to 20 μm in a division shape 1, the swing speed is given by a low speed of 5 mm/min. Also, when it is assumed that substantially a target rocking shape is reached in a division shape 2 and the amount of residual machining is 0 to 5 μm, the swing speed is given by a high speed of 20 mm/min. In this case, a difference in the swing speed at the time when an electrode moves from the division shape 2 to the division shape 1 is 15 mm/min and large. In a swing speed switching command, a delay occurs by the position detecting time and the calculation time of the amount of residual machining and the swing speed at the time when the electrode moves from the division shape 2 to the division shape 1 and, for example, when the delay time such as the detecting time of an electrode position is 10 ms and the swing speed is 20 mm/min (about 333 μm/s), the electrode will move by about 3.3 μm before the swing speed changes.

In order to prevent the delay of a control system due to such a difference in the swing speed, as the advanced read function, this invention has a function of previously performing deceleration control of movement of the electrode in case that the difference in the swing speed exceeds a predetermined value. In this advanced read function, a swing speed VL calculated from the amount of residual machining of the division shape 1 stored by the rocking movement completion determination part 18 at the time of swing before one round is compared with a swing speed VH calculated from the amount of residual machining of the division shape stored by the rocking movement completion determination part 18 at the time of swing before one round forward by a predetermined number of divisions before an electrode position reaches the division shape 1, and when a value of (VH-VL) exceeds a predetermined standard and is large, the swing speed is reduced from the division shape forward by the predetermined number of divisions and the electrode moves to the division shape 1.

For example, the swing speed VL calculated from the amount of residual machining of the division shape 1 at the time of swing before one round is compared with a swing speed calculated from the amount of residual machining up to a division shape 3 which is a division shape forward by three pieces at the time of swing before one round, and when a large swing speed exceeding a predetermined standard compared with the VL is given in the range from the division shape 2 to the division shape 3, the rocking movement control part 19 gives a deceleration command at the time of a swing speed command and gives the same swing speed as that of the division shape 1 to move the electrode.

In the above description, as the advanced read function, the case of performing deceleration control of movement of the electrode when the difference in the swing speed exceeds a predetermined value has been shown, but it may be constructed so as to perform deceleration control of movement of the electrode when a difference in the amount of residual machining exceeds a predetermined value.

By such an advanced read function, the delay of a control system due to the difference in the swing speed can be prevented, so that a left section can be reduced and shape accuracy can be improved. Further, machining time can be reduced.

Industrial Applicability

As described above, the electric discharge machining method and apparatus according to this invention are suitable for use in rocking machining.

What is claimed is:

1. An electric discharge machining method of dividing a rocking shape for a change in a swing speed and a rocking movement completion determination and determining whether or not a target machining shape is reached every each division shape and completing rocking machining when the rocking movement completion determination is made in all the division shapes, characterized in that the rocking shape is divided so that either one or both of each corner and the center of each side of the target machining shape is located on a bisector or substantially a bisector of a division angle.

2. An electric discharge machining method of dividing a rocking shape for a change in a swing speed and a rocking movement completion determination and determining whether or not a target machining shape is reached every each division shape and completing rocking machining when the rocking movement completion determination is made in all the division shapes, characterized in that the rocking shape is divided while changing a division angle.

3. An electric discharge machining method of dividing a rocking shape for a change in a swing speed and a rocking movement completion determination and determining whether or not a target machining shape is reached every each division shape and completing rocking machining when the rocking movement completion determination is made in all the division shapes, characterized in that a first swing speed calculated from the amount of residual machining at the time of swing before one round in a first division shape which is any one of the division shapes is compared with a second swing speed calculated from the amount of residual machining at the time of swing before one round in a division shape forward by a predetermined number of divisions before the first division shape is reached, and when a value of (the second swing speed minus the first swing speed) exceeds a predetermined standard and is large, the swing speed is reduced from the division shape forward by the predetermined number of divisions and an electrode is moved to the first division shape.

4. An electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, characterized in that there is provided a rocking shape division part having a function of dividing the rocking shape so that either one or both of each corner and the center of each side of the target machining shape is located on a bisector or substantially a bisector of a division angle.

5. An electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, characterized in that there is provided a rocking shape division part having a function of dividing the rocking shape while changing a division angle.

6. An electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, characterized in that there are provided a residual machining amount calculation part having a function of calculating the amount of residual machining from a difference between the target machining shape and the present electrode position, and a rocking movement control part having a function of setting the swing speed using swing speed data previously prepared from the amount of residual machining calculated from the residual machining amount calculation part and a function of comparing a first swing speed calculated from the amount of residual machining at the time of swing before one round in a first division shape which is any one of the division shapes with a second swing speed calculated from the amount of residual machining at the time of swing before one round in a division shape forward by a predetermined number of divisions before the first division shape is reached and reducing the swing speed from the division shape forward by the predetermined number of divisions and moving an electrode to the first division shape when a value of (the second swing speed minus the first swing speed) exceeds a predetermined standard and is large.

7. An electric discharge machining method of dividing a rocking shape for a change in a swing speed and a rocking movement completion determination and determining whether or not a target machining shape is reached every each division shape and completing rocking machining when the rocking movement completion determination is made in all the division shapes, characterized in that the rocking shape is divided while changing a division angle, wherein the rocking shape is divided so that the division angle becomes smaller with an approach to each corner of the target machining shape.

8. An electric discharge machining apparatus having a function of dividing a rocking shape for a change in a swing speed and a rocking movement completion determination and determining whether or not a target machining shape is reached every each division shape and completing rocking machining when the rocking movement completion determination is made in all the division shapes, characterized in that there is provided a rocking shape division part having a function of dividing the rocking shape while changing a division angle, wherein the rocking shape division part has a function of dividing the rocking shape so that the division angle becomes smaller with an approach to each corner of the target machining shape.

* * * * *